Patented Jan. 5, 1937

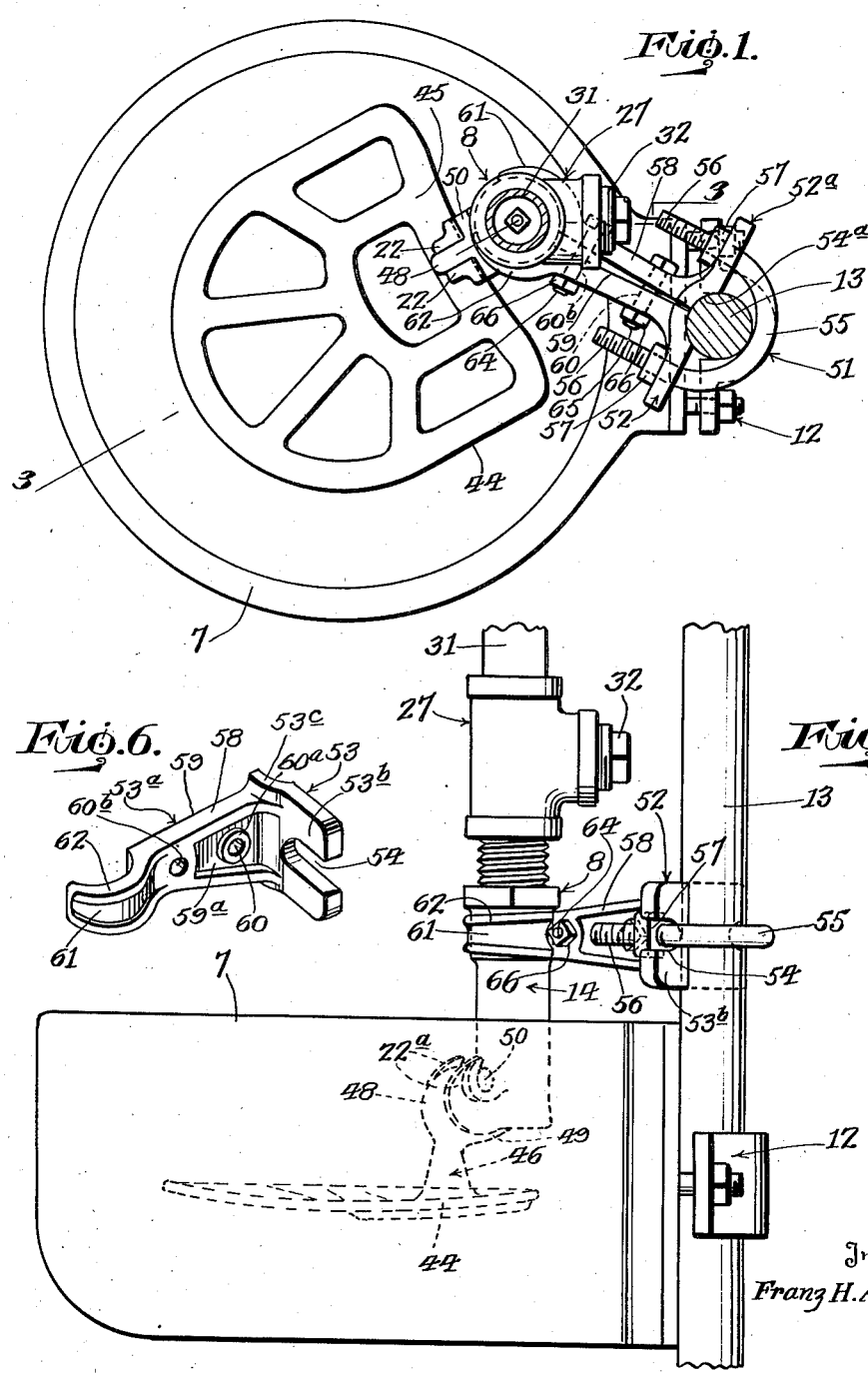

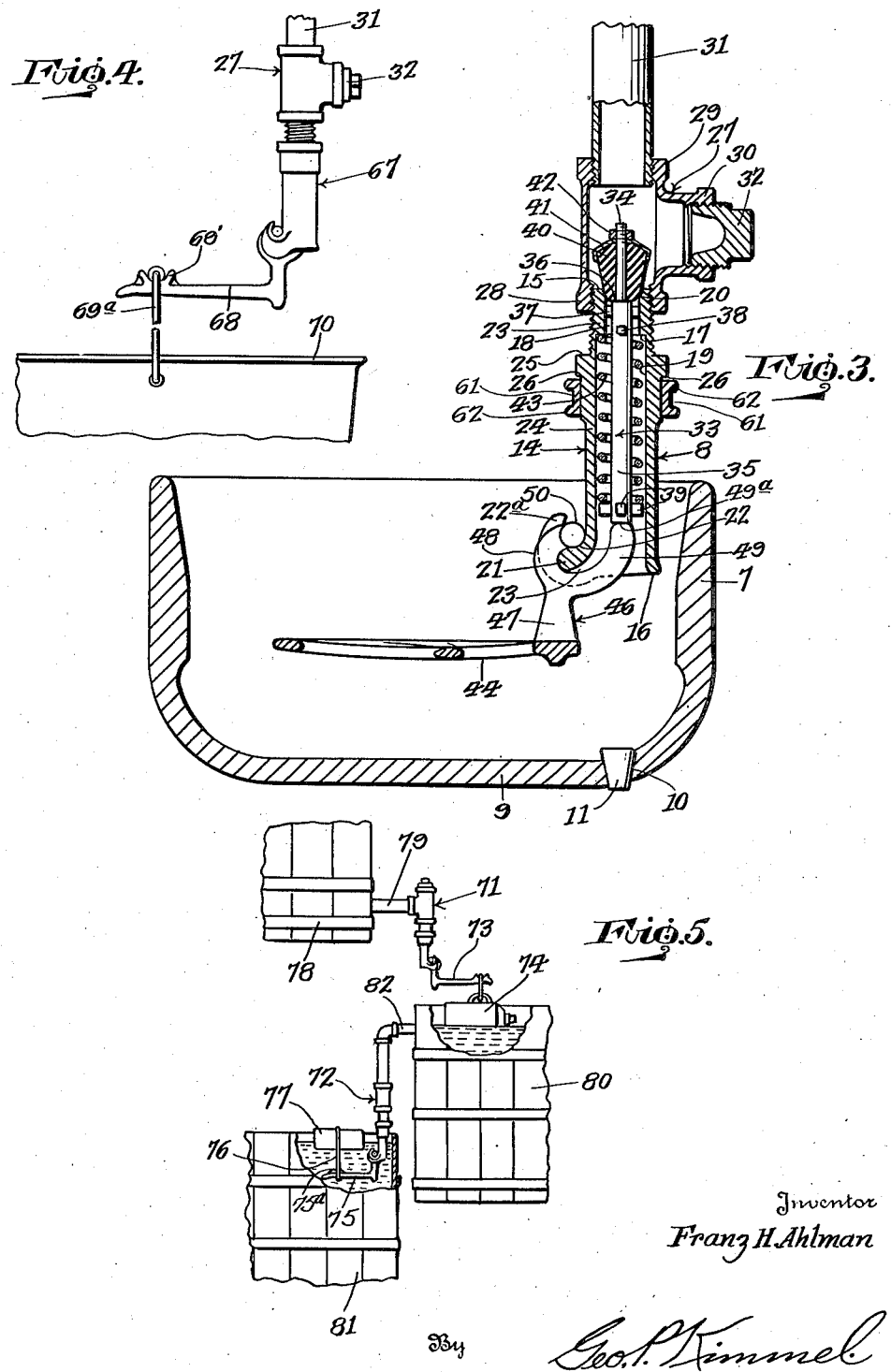

2,067,112

UNITED STATES PATENT OFFICE 2,067,112

ADJUSTABLE WATER SUPPLY CONTROLLING VALVE ASSEMBLY

Franz H. Ahlman, Morristown, Minn.

Application June 10, 1935, Serial No. 25,906

2 Claims. (Cl. 119—75)

This invention relates to an adjustable water supply controlling valve assembly designed primarily for use in connection with livestock watering bowls, but it is to be understood that a valve assembly, in accordance with this invention may be employed in any connection for which it may be found applicable.

The essential object of the invention is to provide, in a manner as hereinafter set forth, a vertically disposed valve assembly which includes means to permit it to be selectively connected to an under or overhead water feed; which is of a structure possessing a self-draining characteristic to prevent it from freezing up and overcome the possibility of its bursting; which includes a water cut-off valve at its upper end and an underslung noseplate at its lower end whereby when in service the water does not reach the valve housing and when the latter is closed no water will be standing in the valve housing; which includes a holder means so formed as to enable the valve housing to be positioned at one side of and with the noseplate directed towards the center of the bowl; which is of a form for use on any type of equipment, whether a stall is of a single, double or triple post type, as the bowl may be attached to one post on a double post stall and swung midway between the two and the assembly set exactly midway with the noseplate turned to the proper angle to equalize the bowl for two animals; which includes a nose-plate having means for opening the cut-off valve without friction and without binding of the valve stem; and which includes means whereby the water feed pipe leading to the assembly may clear a partition between two animals while the bowl is under dead center.

Further objects of the invention are to provide, in a manner as hereinafter set forth, a valve assembly for the purpose referred to which is simple in its construction, strong, durable, compact, readily assembled, thoroughly efficient in its use and inexpensive to manufacture.

With the foregoing objects in view, the invention consists of the novel construction, combination and arrangement of parts as will be hereinafter more specifically described and as are illustrated in the accompanying drawings wherein are shown embodiments of the invention, but it is to be understood that changes, variations and modifications may be resorted to which fall within the scope of the invention as claimed.

In the drawings:

Figure 1 is a top plan view of a livestock watering bowl showing the adaptation therewith of the valve assembly.

Figure 2 is a side elevation of the watering bowl showing the adaptation therewith of the valve assembly, Figure 3 is a vertical sectional view on line 3—3, Figure 1, of the valve assembly as installed with respect to the watering bowl, Figure 4 is a side elevation, of a modified form of assembly as applied to a water pail for filling the latter, Figure 5 is a fragmentary view in side elevation of still another form and illustrating the adaptation thereof with respect to a water supply and a pair of water barrels, and Figure 6 is a perspective view of the form of clamping sections used which provide elements of the suspension which forms a part of the assembly.

With reference to Figures 1, 2 and 3, a livestock watering bowl designated 7 is adapted to have suspended therein a valve assembly 8 in accordance with this invention.

The bowl 7 has its bottom 9 formed with a tapered drain opening 10 closed by a removable plug 11. The bowl 7 is clamped, as at 12, in lateral relation to an upstanding post 13. In Figure 2 the assembly 8 is shown as being clamped, as at 14, in lateral relation to post 13.

The assembly 8 includes an upstanding tubular housing 14 open at its upper and lower ends 15, 16 respectively. The housing 14, between its transverse median and upper end 15, is formed with an internal annular shoulder 17 provided at the junction of the portions 18, 19 of different inner diameters of the housing. The upper end 15 of the housing is beveled to provide a valve seat 20. The housing 14, centrally of the front of its lower end portion, is provided with an outwardly directed flared part 21 which, in lengthwise section, has its upper face of compound curvature to provide a seat 22. The lower face of part 21 is arranged above the lower end edge of the housing. The latter, at each side of part 21, is provided with a pair of outwardly extending upwardly and rearwardly directed spaced parallel retainers 22ª of hook-like form which project beyond and extend above and depend below the part 21. The lower portions of the retainers 22ª coact to provide a passage 23 which opens into the housing 14 at its lower end 16. The retainers 22ª are integral with the part 21 and housing 14. The part 21 forms a fulcrum point for a purpose to be referred to.

The housing 14 is formed of two parts 23, 24 of different outer diameters. The junction of the two parts 23, 24 forms housing 14 with an annular peripheral shoulder 25. The part 24 of housing 14 is of greater outer diameter and is formed with a peripheral shoulder 26 in proximity to shoulder 25. The part 23 is peripherally threaded from end to end.

Threadedly engaging with the part 23 of housing 14 is a leg of a three-way coupling 27. The legs of the latter are indicated at 28, 29 and 30. The leg 28 is connected to part 23. The legs 29 and 30 are provided for selectively connecting to coupling 27 a water supply line. The leg 29 or 30 not selected for connection to the water supply line is to be closed by a removable plug. The leg 29 is for the purpose of connecting an overhead water feed to the housing. The leg 30 is for the purpose of connecting an under water feed to the housing. The drawings show, by way of example, the connecting to the leg 29 an overhead water feed line 31 and the leg 30 closed by a removable plug 32. The legs 28, 29 and 30 are interiorly threaded.

Arranged within and axially of the housing 14 is a vertically disposed valve stem 33 formed of two parts 34, 35 of different diameters and a shoulder 36 at the junction of said parts. The part 34 is of smallest diameter and of less length than part 35. The latter is formed with superposed sets 37, 38 and 39 of radially disposed lugs. The part 35 has its upper portion permanently arranged in the portion 18 of smallest inner diameter of the housing and its lower end permanently spaced above the lower end 16 of the housing. The set of lugs 37 is positioned in proximity to the upper end of part 35. The set of lugs 38 is positioned below and in proximity to the set 37. The set of lugs 39 is arranged in proximity to the lower end of part 35. The lugs 37, 38 extend to and slide against the portion 18 of the housing and act to maintain the stem 33 axially of the housing. The part 34 of stem 33 permanently extends above the upper end 15 of the housing. Encompassing part 34 and seated on shoulder 36 is a flared water cutoff or feed controlling valve 40 of suitable resilient material, such as rubber. Mounted on the upper end of valve 40 is a metallic cap 41. The part 34 extends above the cap 41 and carries a securing nut 42 which coacts with the cap 41 and shoulder 36 for clamping the valve to stem 33. Surrounding the latter and interposed between shoulder 17 and lugs 39 is a coiled controlling spring 43 functioning to normally maintain valve 40 against seat 20. The valve 40 prevents stem 33 from extending through the lower end 16 of the housing and it further acts to always maintain the lower end of the stem 33 spaced above the flared portion 21 of the housing.

The assembly 8 further includes a horizontally disposed skeleton nose-plate 44 having integral therewith, centrally of the rear marginal portion 45 of its upper face, an upstanding combined pivotal plate suspension and valve opening element 46. The latter consists of a vertically disposed tapered stem 47 integral at its lower end with plate 44. The stem 47, at its upper end, merges into a pair of upstanding oppositely disposed arms 48, 49. The arm 48 is curved to extend forwardly and rearwardly and is of substantially semi-oval contour. The arm 49 is curved to extend rearwardly and upwardly and is of greater length than arm 48. The arm 49 is struck upon a materially greater arc than arm 48. The arms 48, 49 are arranged between the retainers 22ª. The arm 48 extends between the upper portion of the retainers 22ª and encompasses the part 21. The upper end of arm 48 merges into a holder 50 mounted in seat 22 and bearing against the rear edges of the upper ends of the retainers 22ª and whereby the element 46 is detachably connected to and is suspended from the front of the lower end of housing 14. The arm 48, in connection with the holder 50, constitutes a fulcrum for element 46. The lower ends of the arms 48, 49 merge into each other. The lower portions of arms 48, 49 are arranged in the passage 23. The arm 49 is so shaped and of such length that its upper end 49ª will abut the lower end of stem 33, whereby when the plate 44 is lowered by the nose of the animal the element 46 will move in a direction to cause the arm 49 to travel upwardly carrying the valve stem 33 therewith and opening valve 40 to cause a water feed or supply against the action of controlling spring 43. When the nose of the animal clears the plate 44, the action of spring 43 will close valve 40.

The assembly 8 further includes a horizontally and vertically adjustable suspension 51 for the housing 14. The suspension may be adjusted to position the housing 14 on the horizontal median of the bowl or adjacent to either side of said median. When the housing is positioned adjacent to either side of said median, the suspension 51 will also permit of the housing being turned on its vertical axis to an extent and in a direction whereby the plate 44 will be directed towards and across the axis of the bowl. After the housing has been arranged in the position aforesaid, the suspension 51 can then be adjusted to clamp the housing in its adjusted position and suspend it in the bowl. The suspension 51 includes means for clamping it to post 13 and such means permits of the vertical, as well as horizontal angular adjusting of the suspension in relation to post 13. The suspension 51 also includes means to permit of the revolving of the housing relative thereto when the housing is connected thereto and when the suspension is fixed to post 13.

The suspension 51 is formed of a pair of oppositely disposed angle-shaped sections 52, 52ª of like form and each includes a rear arm and a forward arm 53, 53ª respectively. The arm 53, at its inner end, merges into the rear end of the arm 53ª. The arms 53, 53ª are disposed at right angles to each other. The arm 53 is of greater width and of less length than that of arm 53ª and is formed with a straight bifurcated outer portion 53ᵇ and a curved inner portion 53ᶜ which is offset forwardly with respect to the portion 53ᵇ. The latter has its furcation extending lengthwise thereof and open at its outer side. The furcation is designated 54. The portions 53ᶜ of the arms 53, when the suspension 51 is anchored to the post 13, coact to form a groove 54ª to receive the post 13. The suspension 51 includes an anchoring means therefor associated with the portions 53ᵇ of the arms 53. The said anchoring means includes a yoke 55 having its sides 56 threaded and carrying adjustable clamping nuts 57. When the suspension 51 is anchored to post 13, the latter extends through groove 54ª, the base of yoke 55 bears against post 13, the sides 56 extend through furcations 54 and the nuts 57 are adjusted to bind against the front face of the arms 53 whereby the suspension 51 is fixedly clamped to post 13 and with the forward inner corners of arms 53 in abutting relation.

The arm 53ᵃ of each of the sections 52, 52ᵃ is tapered and includes an inner portion 58 formed with a flat inner face 59, a recess 59ᵃ in its outer face, an opening 60, an annular boss 60ᵃ surrounding the outer end of opening 60 and arranged in recess 59ᵃ and an opening 60ᵇ arranged forwardly of recess 60ᵃ and at the outer end of portion 58.

The arm 53ᵃ of each of the sections 52, 52ᵃ also includes a curved outer portion 61 which is offset with respect to portion 58 and has a reinforcing rib 62 on its outer face.

The openings 60 of the portions 58 of the arms 53ᵃ align with each other. The openings 60ᵇ of the portions 58 align with each other. Extending through aligning openings 60ᵇ and the aligning openings 60 are headed bolts 64, 65 respectively carrying clamping nuts 66 to bind against the arm 53ᵃ of section 52. The heads of bolts 64, 65 abut the arm 53 of section 52.

The portions 61 of the arms 53ᵃ are adapted to encompass the housing 14 and bear against shoulder 26. The portions 61 of the arms 53 constitute clamps for housing 14. The bolt 65 and the nuts 66 carried thereby coact with the yoke 55 and nuts 57 on the yoke for anchoring the sections 52, 52ᵃ in abutting relation and to the post 13. The bolts 64 and the nuts carried thereby coact with the portions 61 of the arms 53ᵃ for clamping the housing 14 in the desired position. When the nuts 66 on the bolt 64 are loosened the housing 14 may be horizontally adjusted to extend plate 44 towards the axis of the bowl without disconnecting housing 14 from sections 52, 52ᵃ and without disconnecting the suspension 51 from post 13. After the housing 14 has been horizontally adjusted to the desired position, the nuts 66 on the bolt 64 are screwed home whereby housing 14 will be clamped in its adjusted position. On loosening the nuts 66 on bolt 65 and the nuts 57 on yoke 55 the housing 14, when connected to sections 52, 52ᵃ, and the sections 52, 52ᵃ may be bodily vertically adjusted relative to post 13.

Referring to Figure 4, the valve assembly 67 shown thereby is of the same construction as that of assembly 8, with the exception that for the nose-plate 44 there is substituted a lever arm 68 formed with a notch 68' for mounting on arm 68 the bail 69ᵃ of a water bucket 70 for suspension from arm 68 to be filled with water passing through the housing of assembly 67 when the latter is open. The element 68 of assembly 67 is shifted to open the latter when the bucket is suspended from arm 68.

Referring to Figure 5, a water feed control is illustrated which includes a pair of valve assemblies 71, 72 of the same construction as the assembly 8 with the exception that the nose plate is dispensed with. In lieu of the employment of the nose plate 44 in assembly 71, a lever arm 73 is used which has suspended therefrom a float 74. In lieu of the employment of the nose plate 44 in assembly 72, a lever arm 75 is used. The arm 75 carries a weight 75ᵃ and an upright 76 which is connected at its upper portion to a float 77. Otherwise than that as stated, the assemblies 71, 72 will be of the same form as assembly 8. In Figure 5 a water source is indicated at 78 to which is connected, as at 79, the assembly 71 and the latter is arranged relative to a water container 80. The assembly 72 is arranged relative to a water container 81 and is connected, as at 82, to container 80.

The float 74 is in the form of a jug and also functions as a weight, or in other words, element 74 acts as a weight and float combined when the valve is placed well above the container 80 to be kept just so full. But when the valve is used under water, such as shown with respect to container 81, it requires both a weight 75ᵃ and a float 77 to operate the assembly. The weight 77ᵃ which is heavy enough to open the valve is tied to lever arm 75 and the float 77 is tied to arm 75 to raise this weight and so close the valve when the water has reached a certain level. This level is determined by the length of upright 76 which is in the form of a string or wire. A stiff rod would not work without a weight tied direct to lever 75 because it would not push down but would fall sidewise unless braced.

What I claim is:

1. In a water supply controlling valve assembly, a vertically disposed tubular housing open at its upper and lower ends and being formed at its lower portion with an outwardly directed flared part having integral with the sides of the latter retainers extending above and below said part, said retainers, in connection with said part, forming a passage opening into the lower end of the housing, means for connecting a water feed line to the upper end of the housing, a valve normally seating upon and closing the upper end of the housing, said valve being arranged in said means and provided with a spring controlled stem depending in the housing axially of the latter and having its lower end permanently positioned above the lower end of the housing, and a pressure applied element fulcruming on said part and shiftably connected to the housing by said retainers, said element including a part extending through said passage into the housing to oppose the lower end of the valve stem to provide, on the application of pressure to said element, for the upward movement of the valve stem to open the valve against the action of the controlling spring for said stem.

2. In a water supply controlling valve assembly, a vertically disposed tubular housing open at its upper and lower ends and formed at its lower portion with an outwardly directed flared part having integral with the sides of the latter retainers extending above and below said part, said retainers together with said part forming a passage opening into the lower end of the housing, means for connecting a water supply line to the upper end of the housing, an upwardly opening valve normally closing the upper end of the housing and provided with a tensioned stem depending in the housing and having its lower end permanently positioned above the lower end of the housing, and a pressure applied element fulcrumed on said part and shiftably connected to the housing by said retainers, said element including a part extending through said passage into the housing to oppose the lower end of the valve stem to provide, on application of pressure to said element, for the upward movement of said stem and valve to open the latter.

FRANZ H. AHLMAN.